Dec. 5, 1944.  A. W. TONDREAU  2,364,490
FILM MOVEMENT MECHANISM
Filed Feb. 17, 1943  6 Sheets-Sheet 1

INVENTOR.
ALBERT W. TONDREAU,
W E Beatty
ATTORNEY.

Dec. 5, 1944.  A. W. TONDREAU  2,364,490
FILM MOVEMENT MECHANISM
Filed Feb. 17, 1943  6 Sheets-Sheet 2

INVENTOR.
ALBERT W. TONDREAU,
W E Beatty
ATTORNEY.

Dec. 5, 1944. A. W. TONDREAU 2,364,490
FILM MOVEMENT MECHANISM
Filed Feb. 17, 1943 6 Sheets-Sheet 3

INVENTOR.
ALBERT W. TONDREAU,
W E Beatty
ATTORNEY.

Dec. 5, 1944.  A. W. TONDREAU  2,364,490
FILM MOVEMENT MECHANISM
Filed Feb. 17, 1943  6 Sheets-Sheet 4
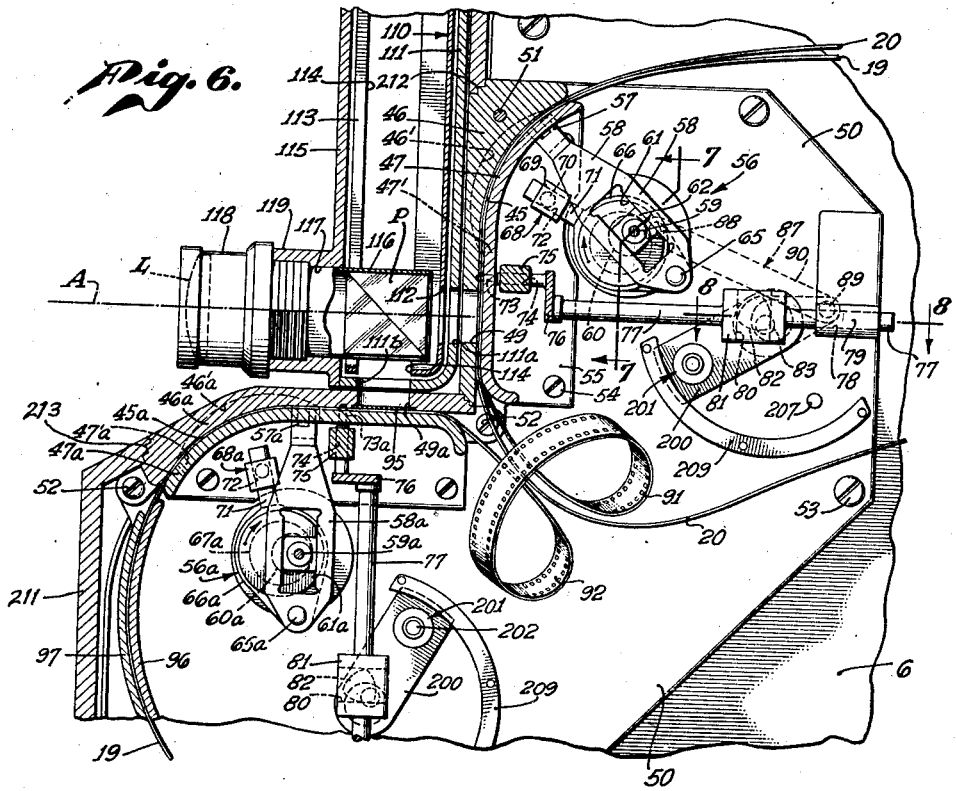
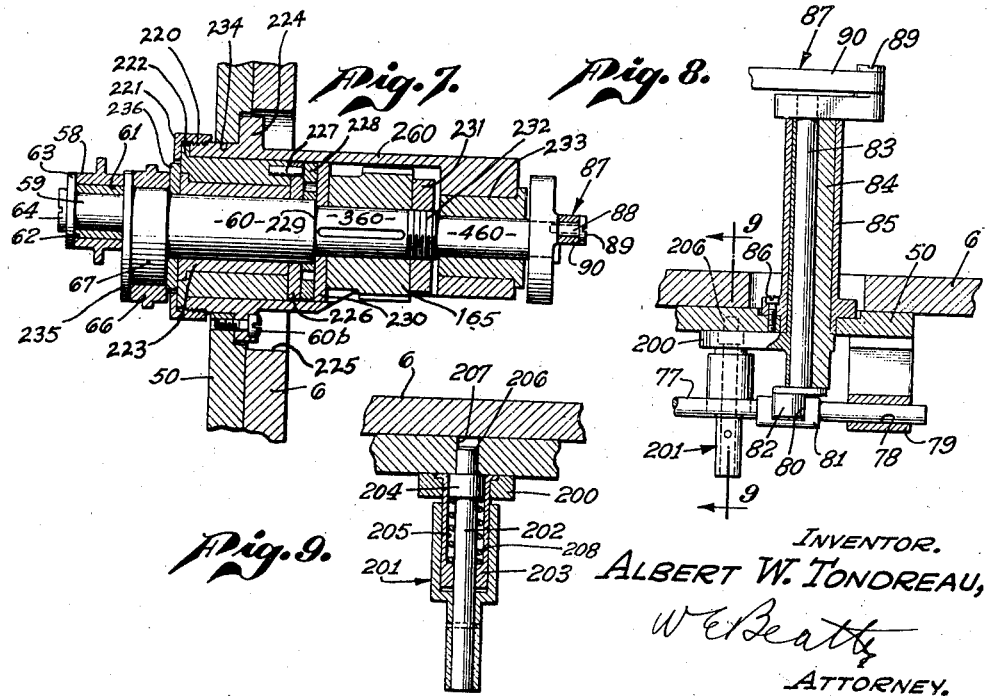
INVENTOR.
ALBERT W. TONDREAU,
W E Beatty
ATTORNEY.

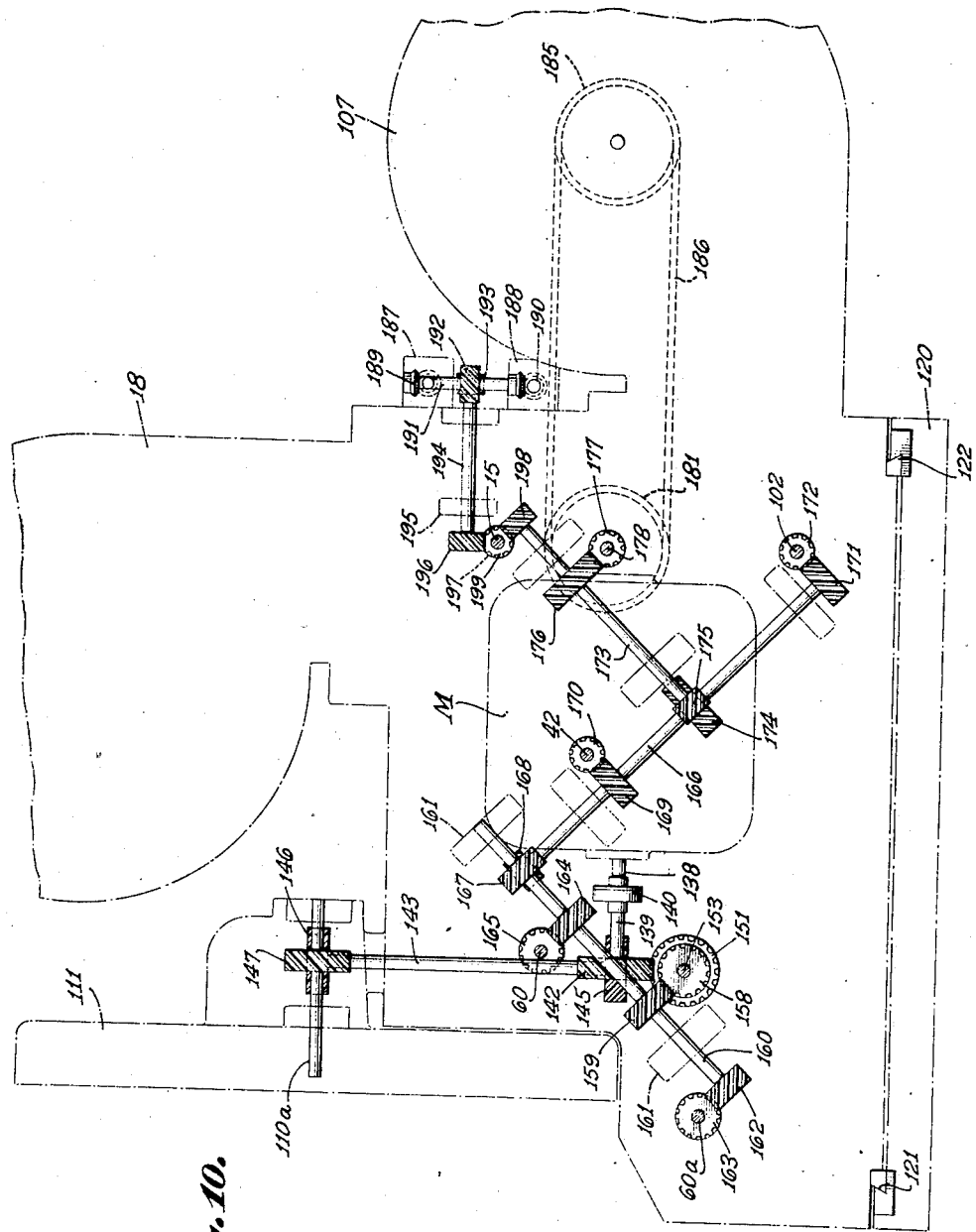

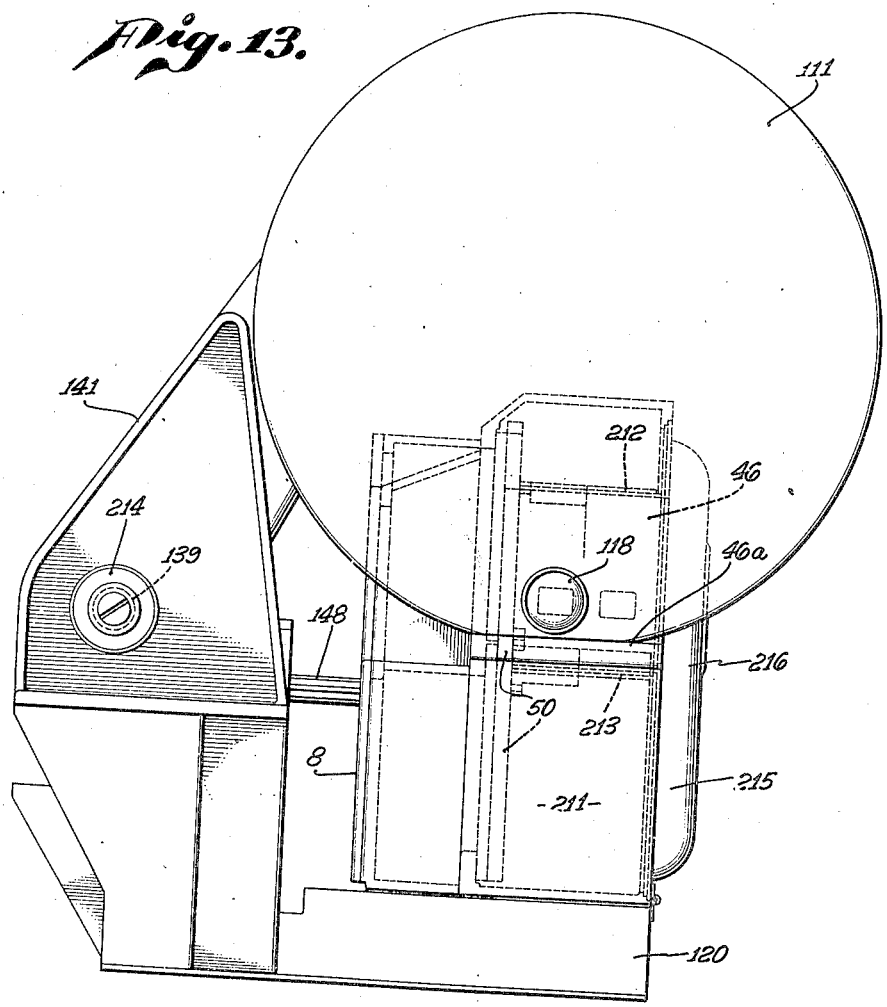

Patented Dec. 5, 1944

2,364,490

UNITED STATES PATENT OFFICE 2,364,490

FILM MOVEMENT MECHANISM

Albert W. Tondreau, Hollywood, Calif., assignor to Warner Bros. Pictures, Inc., New York, N. Y., a corporation of Delaware Application February 17, 1943, Serial No. 476,180

7 Claims. (Cl. 88—18.4)

The present invention relates to a film movement mechanism particularly useful for a camera for color photography, or for other situations where a single film or a bipack is to be used.

An object of the invention is to improve as well as facilitate assembling, adjusting and repairing the working parts of the film movement mechanism.

For further details of the invention reference may be made to the drawings wherein;

Fig. 6 is an enlarged fragmentary detailed sectional view of the film movement means, the optical system and their associated parts.

Fig. 7 is an enlarged detailed sectional view taken on line 7—7 of Fig. 6.

Fig. 8 is a detailed sectional view taken on line 8—8 of Fig. 6.

Fig. 9 is an enlarged detailed sectional view taken on line 9—9 of Fig. 8.

Fig. 10 is a diagrammatic view illustrating the drive means in full lines and the camera outline in dot and dash lines, looking in the direction indicated by line 10—10 on Fig. 3.

Fig. 13 is a front view in elevation of the camera but with a modified door having a bulge to accommodate the film loop.

Figure 1:
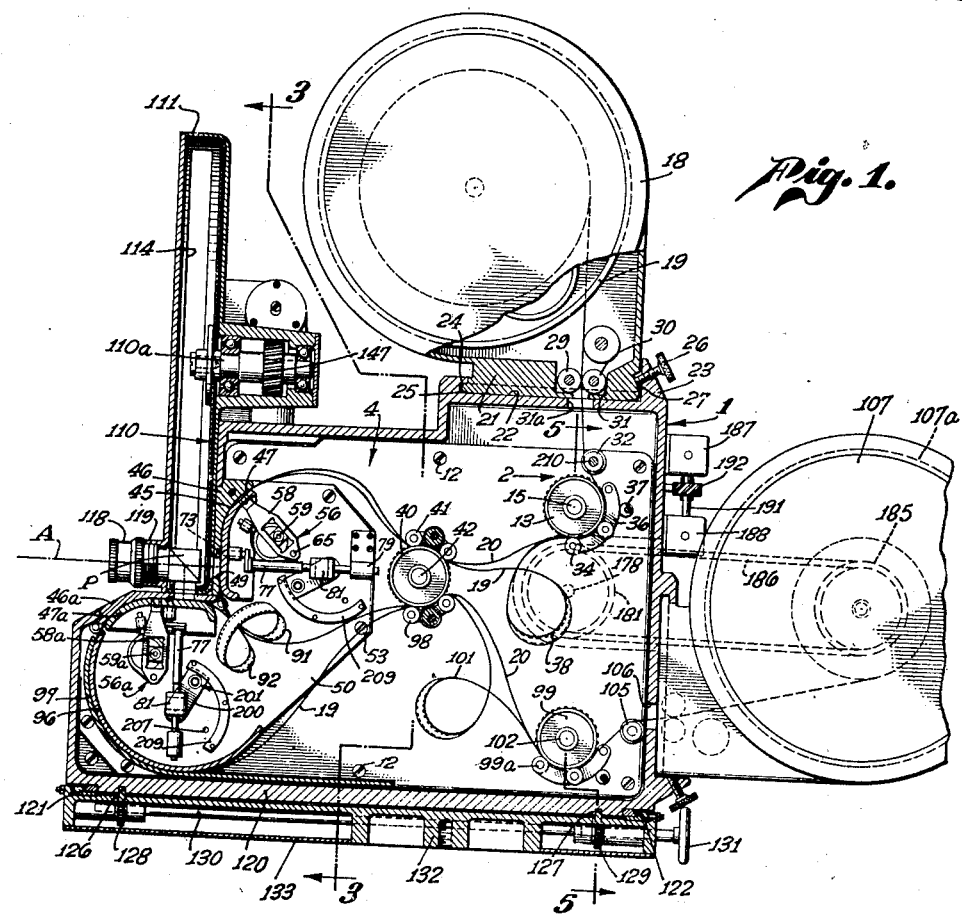
Fig. 1 is a vertical sectional view of a camera embodying the film movement mechanism of this invention.
Figure 2:
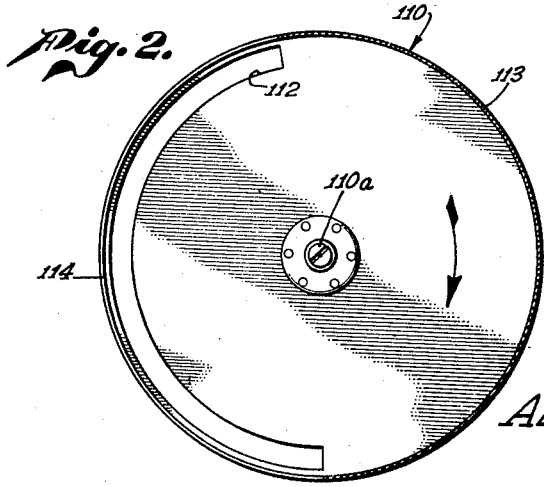
Fig. 2 is an end view of the shutter illustrating its flange in section.
Figure 5:
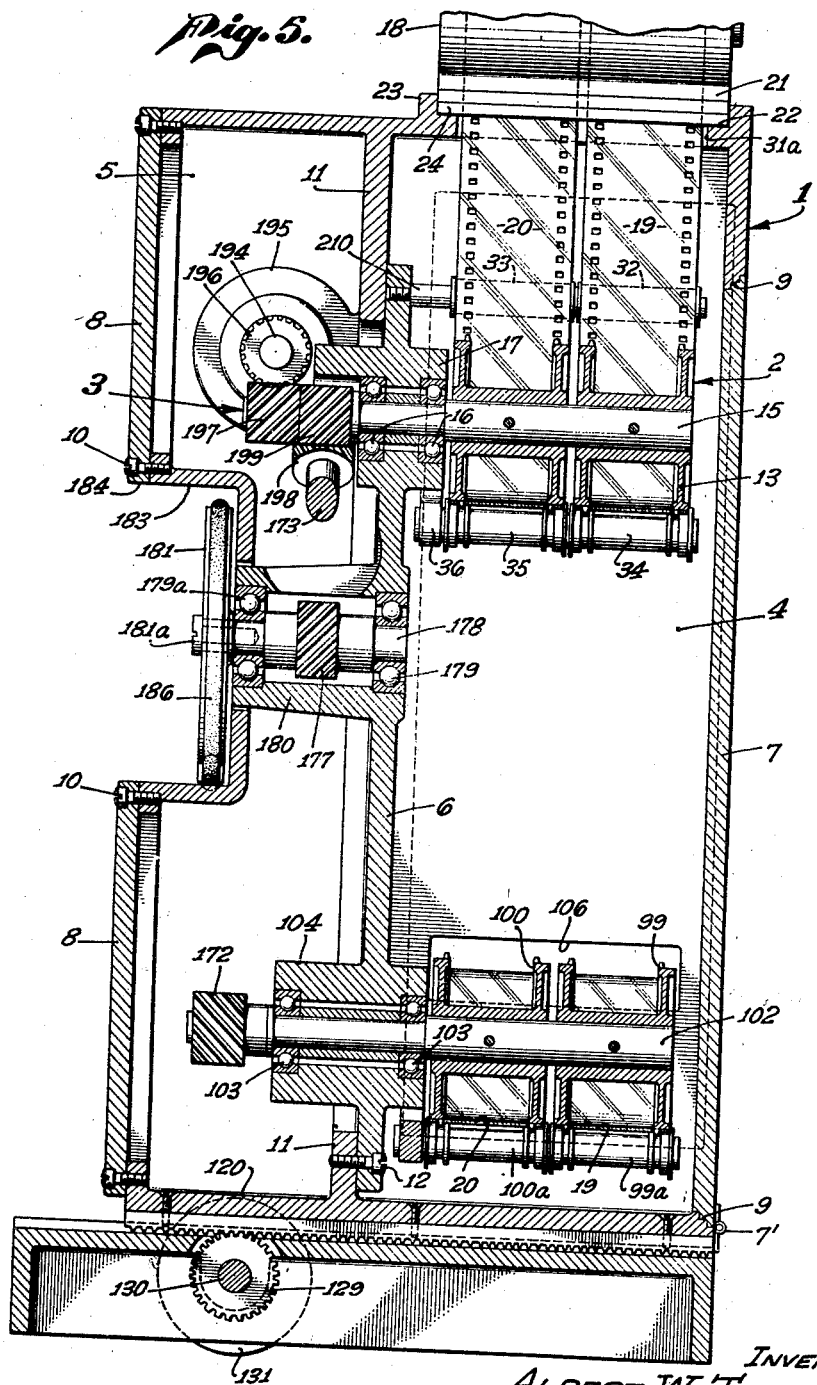
Fig. 5 is an enlarged transverse view taken on line 5—5 of Fig. 1.

Referring in detail to the drawings, particularly Figs. 1, 5 and 6, the camera comprises a housing 1 for housing the means for traversing two films 19 and 20 through the housing 1 and across the exposure apertures 49 and 49a served by the objective lens L.

The housing 1 is a box-like shell divided into two compartments 4 and 5 by a midrib 6. The compartment 4 houses the film handling means generally indicated at 2 and including the feed sprockets 13 and 14, common sprocket 40, film movements 56 and 56a and take-up sprockets 99 and 100. The compartment 5 houses the drive means generally indicated at 3, for the aforesaid sprockets and film movements. Two doors 7 and 8 close the opposite sides of the housing 1 and provide access to the compartments 4 and 5 respectively. The door 7 is hinged at 7' and covers substantially the entire one side of the housing 1. The peripheral edge of the door 7 conforms to the contour of the housing 1 and is provided with cooperating stepped shoulders 9 to maintain a light seal therewith. The door 8 covers substantially the entire other side of the housing 1, except for the well 183 (Fig. 5) and is secured thereto by suitable screws 10.

The midrib 6 is a plate-like member arranged vertically in the housing 1 in a plane parallel to the main optical axis A of the camera and offset relative thereto. The midrib 6 is secured to an inwardly projecting flange 11 formed integral with the walls of the housing 1 (see Figs. 1, 3 and 5). The midrib 6 is removably secured to the flange 11 by suitable screws 12 spaced around its periphery. The midrib 6 carries or supports the film handling means 2 on one side thereof, and the drive means 3 for the same on its other side, and is readily secured to and removable from the housing as a unit through opening door 7, for ease in assembling, adjusting and repairing the working parts of the camera.

The film handling means 2 includes a pair of continuously driven feed sprockets 13 and 14 (see Fig. 5) secured side by side to a common shaft 15. The shaft 15 is mounted for rotation by a pair of antifriction bearings 16 arranged in a boss 17 on the midrib 6 and is rotated by the drive 3 as will be later described. The feed sprockets 13 and 14 feed the film into the camera from a film supply magazine 18 which contains two reels of film 19 and 20. The film 19 is preferably a "panchromatic" film substantially equally sensitive to all colors while the film 20 is an "orthochromatic" film, more sensitive to blue than other colors. The magazine 18 containing the films 19 and 20 is mounted on top of the housing 1 adjacent its rear edge. The magazine 18 has an eccentrically located mounting boss 21 (Figs. 1 and 5) on its under side which cooperates with a raised seat 22 on the upper wall of the housing 1. The film supply magazine 18 is removably secured to the housing by a flange 23 which extends around the seat 22 and closely receives the boss 21, a rib 24 on the forward lower edge of the boss 21 cooperating with a groove 25 in the forward wall portion of the flange 23. A clamp screw 26 threaded through a downwardly and forwardly inclined opening in the rear portion of the flange 23 engages in a notch 27 in the rear side of boss 21, to removably secure the magazine to the housing 1.

The films 19 and 20 coming from the magazine 18 are kept taut by a conventional friction brake (not shown) and are passed down between a pair of rollers 29 and 30 in the opening 31 of the magazine 18.

The films 19 and 20 continue downward through a registering opening 31a in the upper wall of the housing 1 and then past a pair of guide rollers 32 and 33 mounted on a stub shaft 210 projecting from midrib 6. The films 19 and 20 are then trained around the feed sprockets 13 and 14. Suitable retractable rollers 34 and 35 on arm 36 retain the films 19 and 20 in engagement with the sprockets 13 and 14 and the rollers 34 and 35 are held in engagement with the films by a cam latch 37. The films 19 and 20 upon leaving the sprockets 13 and 14 move forwardly in the housing 1. The film 19, the outermost film is given a back loop 38 (see Fig. 1) to side step the film 19 to bring film 19 into the same plane as the film 20 and they are then trained over a common continuously driven sprocket 40 with the emulsion of film 19 in contact with the emulsion of the film 20. The films 19 and 20 are retained on sprocket 40 by suitable retractable rollers 41.

The sprocket 40 is secured to a shaft 42 rotatably carried by a pair of anti-friction bearings 43 (see Fig. 3) mounted in a boss 44 on the midrib 6. The shaft 42 projects through the midrib 6 and into the compartment 5 to be rotated by the drive means 3 to be later described.

The films 19, 20 leaving the common sprocket 40 in face to face relation, form a "bi-pack" and are trained down through a guideway slot 45 formed between aperture plate 46 and the back plate 47. The upper portion of the slot 45 is curved while the lower portion is straight and normal to the main axis A of the optical system. The aperture plate 46 forms a part of the front wall of the housing 1 and its front side is flush therewith and its aperture 49 occurs at the straight portion of the slot in line with the main axis A of the optical system.

The aperture plate 46 is secured to a movement mounting plate 50 by screws 51 and 52, and plate 52 in turn is secured to the midrib 6 by screws 53. The front line of the plate 50 as it appears in Fig. 6 is the same as the front line of aperture plates 46 and 46a, both of which are the front line or surface of the front wall 211. The back plate 47 is arranged closely adjacent to the plate 46, allowing just enough space for the thickness of films 19 and 20 with a suitable clearance. The back plate 47 is secured to the mounting plate 50 by screws 54 passing through a flange 55 formed on the back inner edge of the plate 47. Screws 54 are threaded into the movement mounting plate 50.

Figures 11, 12:
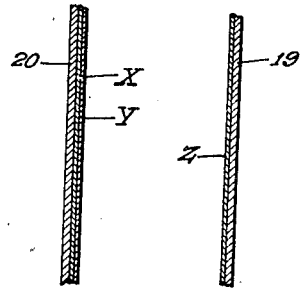
Fig. 11 is an enlarged sectional view of "orthochromatic" film and Fig. 12 is an enlarged sectional view of the "panchromatic" film.

As indicated in Figs. 11 and 12, the "orthochromatic" film 20 has an emulsion X which is highly sensitive to blue for recording a blue sensation record when exposed at the aperture 49 and also has a red dye Y over the emulsion X which acts as a red filter for the "bi-pack," thus recording a red sensation record simultaneously on the "panchromatic" film 19. The "panchromatic" film 19 has an emulsion Z that is sensitive to all colors.

The films 19, 20 in bi-pack relation are intermittently advanced through the slot 45 to expose certain areas thereof at the aperture 49. It is preferred to advance the films 19, 20 as a bi-pack, a distance of two picture frame areas at a time leaving every other picture frame area unexposed for a purpose to be later described.

I provide an improved film movement means 56 for advancing the films 19 and 20 as a bi-pack, and a similar means 56a for advancing only a single film 19. As shown particularly in Fig. 6, the film movement 56 comprises film engaging claws or pins 57 formed on the outer end of an arm 58. The arm 58 is a double ended lever pivoted intermediate its ends on a crank pin 59 formed eccentrically on a shaft 60. As shown in Fig. 7, the shaft 60 is rotatably mounted in a bearing support 260 secured to the movement mounting plate 50 by screws 60b. The shaft 60 is continuously rotated by the drive means 3, and particularly by gear 165 shown also in Fig. 10. Similarly shaft 60a is driven by gear 163. As further shown in Fig. 7 the bearing support 260 is in the form of an open ended tube, the right end of which houses bearing 233 and the left end of which fits in aperture 234 in plate 50 and projects beyond the front of plate 50 where it is provided with screw threads 220 engaging with a screw-threaded cap 221 which retains the bearing sleeve 222 and in fact the whole assembly on shaft 60 in position in the support 260. The shaft 60 is journaled in a bearing 223 in the sleeve 222, both of the latter projecting to opposite sides of plate 50. The bearing support 260 has a flange 224 which is secured to the rear side of plate 50 by the screws 60b, while plate 6 has an aperture 225 which is larger than the flange 224 and through which the bearing support 260 and the parts carried thereby may be withdrawn to the left, when plate 50 is detached from plate 6. A washer 226 is secured against rotation at the end of bearing sleeve 222, by pin 227. A washer 228 having apertures for a lubricant bears against the right side of washer 226. Shaft 60 has a shoulder 229 and the washer 230 fits it and bears against washer 228, and in turn gear 165 bears to the left against washer 230. Gear 165, washers 226, 228 and 230, sleeve 222, bearing 223 and washer 236 are retained under compression against the eccentric 67, by means of a nut 231 on the screw-threaded portion 232 of the reduced section 360 of shaft 60, all of those parts forming the shaft assembly. The bearing support 260 at its outer right end terminates in a bearing 233 for the further reduced right end 460 of the shaft 60. After removing the register pin drive elements 87, 88, 89 and 90 from the right end of shaft 60, and after unscrewing the cap 221, the shaft 60 and its assembly may be withdrawn to the left from the tubular bearing support 260, while leaving the latter secured to plate 50.

The pull-down mechanisms 56 and 56a may be separated from the drive sprockets 40, 13 and 99, by separating plate 50 from plate 6. There is no mechanical connection between the pull-down mechanisms 56 and 56a and their respective register pin mechanisms, at the front of plate 50. There is no means at the front of plate 50 for holding the bearing support 260 thereto. The pull-down mechanism 56 may be removed readily from its register pin mechanism in a simple manner by removing the screw 89. Hence it will be seen that the pull-down mechanisms 56 and 56a and their component parts are each readily accessible as a unit for ease in assembling, adjusting and repairing the working parts.

The crank pin 59 works in an elongated slot 61 in the arm 58 and is provided with a hardened wear taking block 62. A retaining washer 63 is attached to the end of the pin 59 by a screw 64 to hold the block 62 and the arm 58 against displacement from the shaft 60. Washer 235 fits between arm 58 and block 62 at the front thereof, and ring 66 and eccentric 67 at the back thereof. Ring 66 and eccentric 67 fit against washer 236 which bears on the end of bearing sleeve 222 and bearing 223. The inner end of the arm 58 is pivotally connected at 65 to an oscillating ring 66. The ring 66 surrounds an eccentric 67 formed on the shaft 60. The axis of the eccentric 67 is diametrically opposite the axis of the crank pin 59 to give the desired motion to the arm 58. The ring 66 has an anchor 68 diametrically opposite its pivotal connection 65 with the arm 58. The anchor 68 prevents rotation of the ring 66 and gives it an oscillating motion. The anchor 68 comprises a block 69 pivoted on a pin 70 in the mounting flange 55 of the back plate 47. A rod 71 projects from the ring 66 and is slidably received in an opening 72 in the block 69. The anchor 68 thus provides a rocking slide bearing for rod 71.

As the shaft 60 rotates, the crank pin 59 in being diametrically opposite the eccentric 67, gives the arm 58 a smoother action with much less sawing of its pins 57 in the perforations of the film. The crank pin 59 with the aid of the oscillating ring 66 gives the arm 58 the desired swing motion while the oscillating ring 66 alone produces the reciprocation of the arm 58 and the reciprocation of the arm occurs while the crank pin 59 is dwelling, thus allowing the pins 57 to move into and out of the film perforations while the film remains still.

Suitable pilot pins 73 are employed in conjunction with the movement means 56 to hold the film in register with the aperture 49 while the exposure is taking place and the arm 58 is being retracted and returned to the successive film engaging position ready to advance the next portion of film. The pilot pins 73 are guided for reciprocation in openings 74 in a boss 75 projecting from the mounting flange 55 of the back plate 47. The pins 73 engage in perforations at opposite sides of the films 19, 20 and their inner ends are connected by a plate 76. The plate 76 is connected to a push rod 77 which is slidably received in an opening 78 in a bearing block 79 attached to the movement mounting plate 50. The push rod 77 has a cam notch 80 formed in a thickened portion 81 (see Figs. 6 and 8) and a cam 82 operating in the notch 80 reciprocates the rod 77 and its pins 73.

The cam 82 is formed on the end of a shaft 83 which is mounted for oscillation in a sleeve bearing 84. The shaft 83 is eccentrically located in the sleeve 84 for purpose to be later described. The sleeve bearing 84 is carried in a tubular boss 85 secured to the movement mounting plate 50 by screws 86. A suitable connection 87 is provided between the shaft 60 and the shaft 83. The connection 87 is located behind the midrib 6 in the compartment 5. Connection 87 comprises a connecting rod 90 pivotally connected at its upper end as shown in Fig. 7 to a crank pin 88 secured to the inner end of shaft 60, connecting rod 90 being pivotally connected at its lower end as shown at the top of Fig. 8 to a crank pin 89 secured to the shaft 83. The radius of eccentricity of crank pin 89 is greater than that of crank pin 88 as indicated in Fig. 6. Rotation of shaft 60 causes reciprocation of connecting rod 90 to oscillate shaft 83 and cam 82, to reciprocate the pilot pins 73. The operation of the pilot pins 73 is so timed that they remain in engagement with the perforations in the films from the time the feeding pins 57 start to leave the perforations until they again are engaged in the perforations.

The "orthochromatic" film 20 upon leaving the aperture 49 is directed towards the rear of the housing 1 while the "panchromatic" film 19 is given a back loop 91 to sidestep the rearwardly moving film 20 and is given another back loop 92 to bring it back into line again on the other side of the film 20 (see Fig. 6). The "panchromatic" film 19 continues forward, with its emulsion side up, to traverse a second aperture 49a where the unexposed areas are successively subjected to a reflected beam of light. A prism P is provided in the optical system to split the light into a direct beam and a reflected beam. Prism P is arranged between the lens L of the optical system and the apertures 49, 49a, as will later more fully be described. The reflected light is passed through a "plus" green filter 95 carried by the aperture plate 46a, to make a green sensation record on the film 19 between the alternate red records already on it. The aperture plate 46a is similar to aperture plate 46, but reversed in position and at right angles thereto. The film 19 is trained through a guide slot 45a between the aperture plate 46a and a back plate 47a similar to plate 47. The axis of the diverted beam of light is substantially normal to the main axis A of the optical system.

The film 19 is intermittently advanced through the guide slot 45a in synchronism with the advancement of film "bi-pack" 19, 20 through guide slot 45. Film movement means 56a similar to the above described means 56, advances the film 19 and includes claws 57a on arm 58a for engaging the film 19. Arm 58a slidably receives crank pin 59a and is pivotally connected at 65a to oscillating ring 66a. The ring 66a is mounted on eccentric 67a formed on shaft 60a which also carries crank pin 59a and is anchored at 68a. The operation of the film movement means 56a is substantially the same as the movement means 56 described above.

The claw 57 works in a notch 47' in the back plate 47 and in a notch 46' in the front plate 46. Also the claw 57a works in a notch 47a' in the back plate 47a, and in a notch 46a' in the front plate 46a. The length of travel of the claws 57 and 57a is substantially that of the length of the notches above described, as illustrated in Fig. 6. The shaft 60 and 60a rotate in a clockwise direction which causes the claws 57 and 57a to sweep in a counter-clockwise direction, whereby the films 19 and 20 move downwardly past the aperture 49, the film 19 moving from right to left across the aperture 49a. The claws 57 and 57a move the films 19 and 20 two picture frames at a time, with the result that film 20 has only alternate frame areas exposed, while film 19 has all picture frame areas exposed, the exposure of film 19 at aperture 49 being in the even numbered frames and at aperture 49a in the odd numbered frames or vice versa.

Pilot pins 73a and their associated operating parts for the movement means 56a are identical with the aforedescribed pilot pins 73 for the movement means 56 so the same numeral will appear on the drawings.

Upon leaving the guide slot 45a, suitable guides 96 and 97 direct the film 19 in a U shaped path back towards the rearwardly moving film 20. The two films 19 and 20 are brought together and trained in superposed relation across the underside of the common sprocket 40 and held in cooperation therewith by retractable rollers 98. The films 19 and 20 then move downwardly and rearwardly to laterally spaced take-up sprockets 99 and 100 and held therewith by retractable rollers 99a and 100a (see Figs. 1 and 5). The film 19 after leaving the common sprocket 40 is given a back loop 101 to sidestep the film 20 and bring film 19 into line with its sprocket 99. The sprockets 99 and 100 are fixed on shaft 102 mounted for rotation by spaced antifriction bearings 103 in a boss 104 on midrib 6. The shaft 102 projects into the compartment 5 to be driven by the drive means 3 to be later described.

The films 19 and 20 upon leaving the take-up sprockets 99, 100 pass over guide rollers 105 (Fig. 1) out through opening 106 in the rear wall of the housing 1 to be wound up in the take-up magazine 107 on reels 107a. The drive for reels 107a will be later described. The construction of the magazine 107 and its means of attachment is identical with that of the supply magazine 18 described so as to be interchangeable therewith.

A shutter 110 is mounted in a housing 111 for rotation on a shaft 110a between the apertures 49, 49a and prism P. The housing 111 is mounted stationary relatively to the main camera housing 1 and the camera base 120, as will be subsequently described. The shutter 110 is a disc-like body with an arcuate slot 112 (Fig. 6) which extends substantially 170° and registers with the aperture 49. An axially extending flange 113 projects forwardly from and at right angles to the body 110 and passes between the prism P and the aperture 49a and has a slot 114 which registers with the aperture 49a. The bolt 114 is of same extent as the slot 112 and registers with the aperture 49a in synchronism with the slot 112 registering with its aperture 49. The housing 111 has an opening 111a which registers with aperture 49 and an aperture 111b which registers with aperture 49a. The housing 111 has its back wall close to the aperture plate 46 and its lower wall close to the aperture plate 46a with slight clearance. The forward end of the housing 111 is closed by a cover plate 115. The cover plate 115 carries the lens L and the prism P of the optical system. The prism P is mounted in a suitable holder 116 secured in an opening 117 in the cover plate 115 and the lens holder 118 is threaded into a tubular boss 119 on the front of the cover 115.

The camera housing 1 is mounted on a base 120 (Figs. 1 and 10) and is provided with guide ways 121 and 122 at its front and rear edges respectively to allow for transverse movement of the camera with respect to the base 120. The shifting of the camera moves the axis of the view finder 123 into optical alignment with the main axis of the optical system. The view finder 123 is mounted on the door 7 (see Fig. 3) and includes a lens tube 124 having the usual ground glass and a prism located at the inner end of the view finder 123 in register with its window 125. The window 125 of the view finder is brought into register with the opening 111a in the shutter housing 111 upon shifting of the camera, so that the operator can look through the optics of the camera to see the exact areas exposed to the apertures 49 and 49a.

To provide for laterally shifting the camera, spaced racks 126 and 127 are attached to the underside of the housing adjacent the front and rear guideways 121 and 122 (see Fig. 1). Gears 128 and 129 engage the racks 126 and 127, respectively, and are fixed on a common shaft 130 journaled in the base 120. The shaft 130 projects from the rear end of the base 120 and a manual operating handle 131 is fixed thereto. Suitable positioning means (not shown) may be provided to locate the camera in its two positions. The base 120 is provided with a threaded boss 132 exposed at its underside for receiving the holddown screw of the usual tripod mount (not shown), while the major portion of its lower side is covered by a plate 133.

The drive means 3 for the camera diagrammatically illustrated in Fig. 10, comprises a motor M clamped in a cradle 135 by a band 136 secured to cradle 135 by screws 213. Cradle 135 is mounted on a shelf 137 of the base 120 (see Fig. 3). The motor shaft 138 is connected with a shaft 139 through a suitable friction clutch indicated at 140. The outer end of shaft 139 is journaled in a bearing 214 fixed in the lower end of a bracket 141. Bracket 141 supports the shutter housing 111 and it may be formed integral with the cradle 135 (see Figs. 3 and 4). The shaft 139 has a spiral gear 142 incased in the lower end of the bracket 141. The drive for the shutter 110 includes a shaft 143 housed in a tubular bearing tube 144 formed on the back side of the bracket 141. Shaft 143 has a spiral gear 145 at its lower end which meshes with the gear 142, and a spiral gear 146 at its upper end which meshes with a mating gear 147 on the shutter shaft 110a.

The drive between the motor M and the drive means 3 in the housing 1 comprises a telescopic connection 148 (see Fig. 4) which permits the lateral shifting of the camera for view finding. The telescopic connection 148 comprises a shaft 149 mounted for rotation on spaced antifriction bearings 150 carried by the bracket 141. The shaft 149 has a spiral gear 151 that meshes with the motor driven gear 142 on one end and a splined socket 152 in its other. A stub shaft 153 projects from the housing 1 through an opening 154 in the door 8. The shaft 153 is carried by spaced antifriction bearings 155 mounted in a boss 156 on the midrib 6. Shaft 153 has splines 157 formed in its projecting end portion for cooperating with the splined socket 152 of shaft 149 and carries a spiral gear 158. The gear 158 is located between the spaced bearings 155 and meshes with a mating gear 159 fixed on a shaft 160. The shaft 160 is carried by spaced bearings 161 on the midrib 6 and is disposed at a 45° angle, being pitched upwardly and rearwardly adjacent the side of the midrib 6. The driven shaft 160 drives the two film movements 56 and 56a. A spiral gear 162 fixed on the lower end of the shaft 160 meshes with a mating gear 163 on the shaft 60a of the film movement means 56a and a similar gear 164 located above gear 159 meshes with a gear 165 on the shaft 60 of the film movement means 56.

The driven shaft 160 drives a second angularly disposed shaft 166 arranged at right angles to the shaft 160 but in a laterally spaced plane relative thereto. The shaft 166 is pitched downwardly and rearwardly and is driven by a pair of spiral gears 167 and 168 fixed to the upper ends of the shafts 160 and 166 respectively. The shaft 166 is connected to the shaft 42 of the common sprocket 40, to drive the same, by a pair of spiral gears 169 and 170 fixed on the shafts 166 and 42, respectively. The lower take-up sprockets 99, 100 are also driven by the shaft 166, and a pair of spiral gears 171 and 172 fixed to the ends of the shaft 166 and the shaft 102, respectively, connect the take-up sprockets 99, 100 for rotation.

A third angularly disposed shaft 173 is driven by the shaft 166. The shaft 173 is arranged in the same vertical plane as the shaft 160 and parallel therewith to have its axis normal to the axis of the shaft 166. A pair of spiral gears 174 and 175 are fixed to the shafts 166 and 173, respectively. The shaft 173 is connected to the shaft 15 of the feed sprockets 13 and 14 by a pair of spiral gears 198 and 199 fixed to the shafts 173 and 15, respectively.

The shaft 173 forms a part of the drive for the take-up reels 107a and comprises a spiral gear 176 fixed to the shaft 173 and meshing with a mating gear 177 on a shaft 178. The shaft 178 is rotatably carried by spaced bearings 179, 179a (see Fig. 5) mounted in a boss 180 on the midrib 6. The gear 177 is arranged on the shaft 178 between the bearings 179, 179a and a pulley 181 is removably secured by screw 181a to the outer end of the shaft 178 which projects through the side wall of housing 1. A depression 183 formed in the side of the housing 1 adjacent its rear edge receives the pulley 181 and the door 8 is notched at 184 to leave the pulley uncovered and readily accessible. A similar pulley 185 is connected to the shaft of the take-up reels 107a and a suitable belt 186 connects the two pulleys 181 and 185 for rotation.

The usual friction drive (not shown) is provided in the shaft for the take-up reels 107a so as to properly take-up the films 19 and 20 regardless of the peripheral speeds required. The friction drive in the take-up magazine 107 becomes the friction brake in the supply magazine 18 when used for the same, and vice versa as is common practice.

Counters 187 and 188 are provided to register the amount of film wound up on the reels 107a and also the amount used for each scene and are mounted on the back wall of the housing 1. A pair of miter gears 189 and 190 at each counter 187 and 188, respectively, are connected together by a common shaft 191. The shaft 191 intermediate its ends, has a spiral gear 192 fixed thereto and a meshing gear 193 is secured on the outer end of a shaft 194. The shaft 194 is mounted for rotation in a boss 195 on the rear wall of the housing 1 and carries a spiral gear 196 on its inner end. The gear 196 meshes with a mating gear 197 on the end of the shaft 15 of the feed sprockets 13, 14 adjacent the gear 198 (see Fig. 5).

Figure 3:
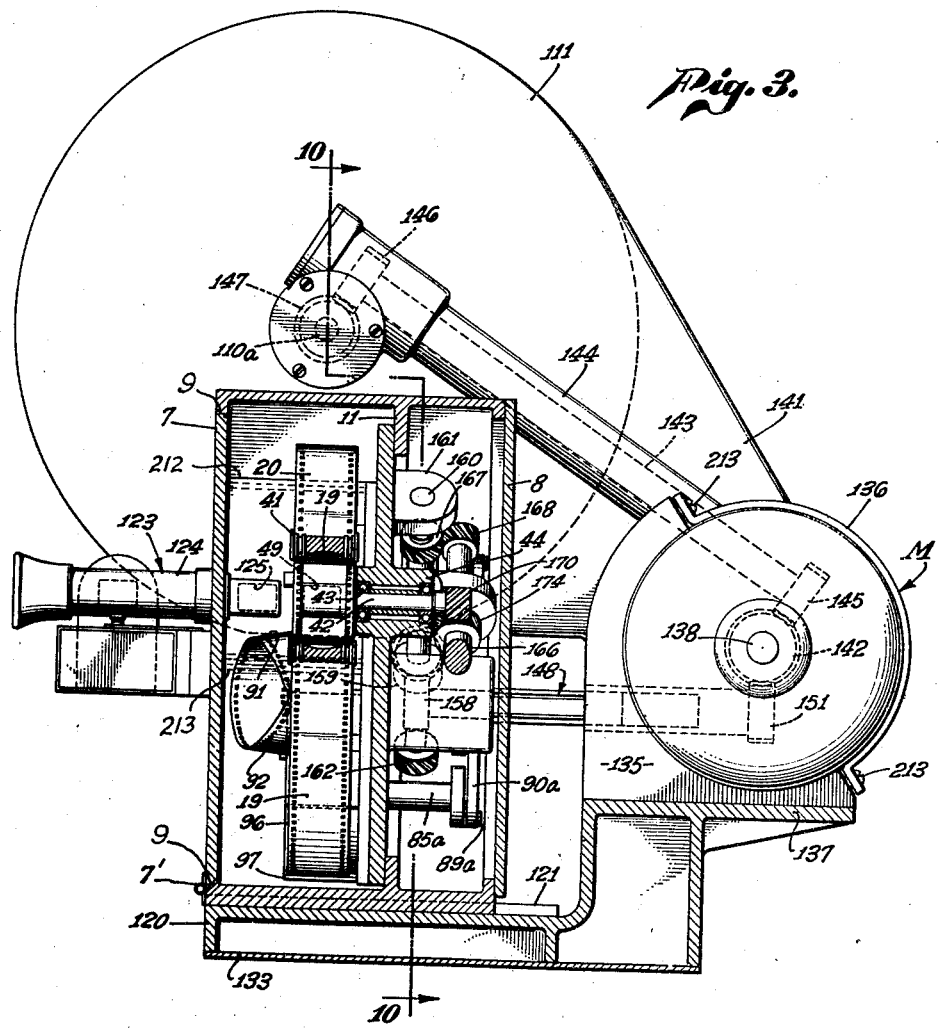
Fig. 3 is an enlarged transverse sectional view taken on line 3—3 of Fig. 1.
Figure 4:
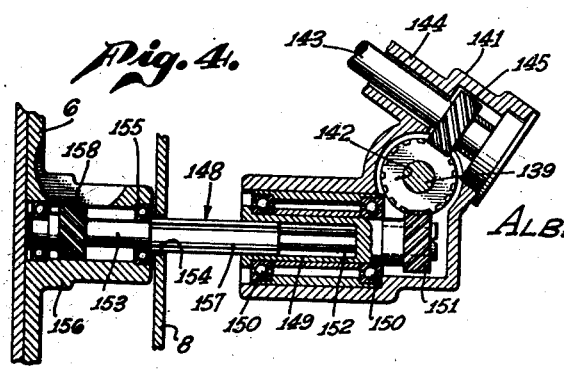
Fig. 4 is a detailed sectional view of the telescoping drive connection between the shiftable camera and the power supply.

Referring to Fig. 6 it will be seen that the L shaped aperture plates 46 and 46a merge with and fit in the angular front wall 211 of the camera alongside of the movement mounting plate 50. The aperture plates 46 and 46a have a light seal fit with wall 211 by means of cooperating stepped shoulders 212 and 213. The shoulders or light seals 212 and 213 extend straight out at right angles to the plane of Fig. 6 until they meet door 7, as shown in Fig. 3, and the ends of these shoulders 212 and 213 are light sealed by the inside of door 7. This is also shown in Fig. 13 where the outer ends of shoulders 212 and 213 are light sealed by door 215. The door 215 may have a bulge 216 to provide more space for loop 91, 92.

By opening door 7 and removing screws 12 which hold the plate 6 to the flange 11, and by removing screw 181a and pulley 181, plate 6, with the film handling means 2 (including movement mounting plate 50 and aperture plates 46 and 46a), and with the film driving means 3 mounted thereon, may be removed as a unit through the opening of door 7, the telescopic connection 148 permitting shaft 153 to be removed from socket 152. Hence the film handling means 2 and the film drive 3 which form a unit with the plate 6, may be readily removed for inspection, adjustment, and repair.

The withdrawal of the pilot pins 73, 73a for threading the films 19 and 20 through the film movement means 56 and 56a is accomplished in a like manner and the description of threading the films 19, 20 through means 56 is as follows. The camera is stopped where its claws or pins 57 are retracted from the perforations in the films as illustrated in the drawings. The pilot pins 73 may then be retracted by turning the sleeve 84 (see Figs. 6, 8 and 9) which carries the eccentrically located cam shaft 83, all of which was described above. Turning of the sleeve 84 results in bodily shifting of the shaft 83 and the retraction of the pilot pins 73, by the cooperation of the cam 82 in cam slot 80 of push rod 77 which in turn is connected with the pilot pins 73. The sleeve 84 has an operating arm 200 which is accessible in compartment 4 of the housing 1. The arm 200 lies adjacent the movement mounting plate 50 and has a releasable latch 201 (Fig. 9) for holding the arm in either its normal position or its retracted position. The latch 201 comprises a retractable plunger 202 which is guided for movement in a tubular sleeve 203 attached to the outer end of the arm 200. The plunger 202 has an enlargement 204 slidably received in a socket 205 in the sleeve 203. The enlargement 204 is located on the plunger a slight distance from its inner end to leave a nose 206 which is selectively engaged in one of its two spaced locating openings 207 in the plate 50. A spring 208 surrounds the plunger 202 and is arranged between the bottom of the socket 205 and the enlargement 204 to releasably hold the arm 200 in its set position. The latch 201 may include an arcuate guide 209 for the end of the arm which relieves the arm of any outward thrusts.

The pull-down means 56a being in the same timed relation with pull-down 56 will also have its feed pins 57a retracted, and to retract its pilot pins 73a, one merely swings the arm 200a around after releasing latch 201a. The film may then be readily threaded through the pull-downs 56 and 56a after which the arms 200 and 200a may be returned to their normal position and latched.

After the films 19 and 20 have been exposed in the camera above described, they may be suitably developed, and then release prints may be prepared in any suitable manner. Some methods of preparing release prints are disclosed in the copending application S. N. 440,797, filed April 28, 1942, by Byron C. Haskin, for Color photography, which application also discloses and claims the generic aspects of the method and means for color photography disclosed in the present application. This case is a continuation-in-part of S. N. 440,796, filed April 28, 1942, for Camera for color photography. The camera disclosed herein is claimed in my co-pending application 476,179, filed February 17, 1943. The film registering mechanism disclosed herein is claimed in my co-pending application 476,181, filed February 17, 1943.

Various modifications may be made in the invention without departing from the spirit of the following claims.

I claim:

1. Film movement mechanism comprising the combination of a mounting plate having an aperture, a bearing support fitting said aperture, means at the rear of said plate for detachably securing said bearing support to said mounting plate, a shaft journaled in said bearing support, said shaft extending to opposite sides of said plate, an eccentric on said shaft at the front of said plate, a ring on said eccentric and claw mechanism connected with said ring, a bearing for said shaft in said bearing support, washer means separating said eccentric and its said ring from the front end of said bearing, a gear on said shaft at the rear side of said plate, washer means between said gear and the adjacent end of said bearing, said shaft having a screw-threaded portion and a cooperating nut for retaining said gear against said last mentioned washer means, a bearing in said bearing support for said shaft rearwardly beyond said threaded portion, a main plate having a sprocket thereon for said claw mechanism, said main plate having an aperture larger in size than said bearing support and said gear, and means removably securing said mounting plate to said main plate.

2. Film movement means comprising a mounting plate having an aperture and a main plate having a concentric larger aperture, a bearing support fitting the aperture in said mounting plate and movable through the aperture in said main plate, means detachably securing said bearing support to said mounting plate, a shaft journaled in said bearing support and projecting to opposite sides of both of said plates, a drive element on said shaft at the rear of said plates, film movement means on said shaft at the front of said plates, an aperture plate and a back plate for said film movement means detachably secured to said mounting plate, and a sprocket for said film movement means on said main plate.

3. Film movement mechanism comprising the combination of a mounting plate having an aperture, a tubular bearing support fitting said aperture and extending to opposite sides of said plate, means at the rear of said plate for detachably securing said bearing support to said mounting plate, a shaft assembly in said tubular bearing support, said shaft assembly comprising (a) a shaft having an eccentric thereon at the front of said plate, (b) a bearing for said shaft, and (c) a gear on said shaft at the rear of said plate; said bearing support having a bore in which said bearing and said gear are slidable detachable means at the front of said plate for securing said shaft assembly in said tubular bearing support and permitting removal of said shaft assembly as a unit lengthwise through said tubular bearing support, and claw mechanism operatively connected with said eccentric.

4. Film movement mechanism according to claim 3 comprising a washer between said eccentric and the outer end of said bearing, washer means engaging the inner end of said bearing and one end of said gear, and a nut on said shaft at the other end of said gear.

5. Film movement mechanism according to claim 3 wherein said shaft behind said gear is provided with an eccentric smaller than said aperture in said mounting plate, and a pilot pin drive removably connected to said last mentioned eccentric.

6. Film movement mechanism according to claim 3 wherein said shaft behind said gear is provided with an eccentric smaller than said aperture in said mounting plate, a pilot pin drive removably connected to said last mentioned eccentric, and a bearing for said shaft in said tubular support between said gear and said pilot pin eccentric.

7. Film movement mechanism according to claim 3 wherein said detachable means comprises a cap around said shaft, said cap having screw threaded engagement with the front end of said tubular bearing support and having a retaining flange in front of said bearing.

ALBERT W. TONDREAU.